Aug. 22, 1967 L. E. SODERQUIST ET AL 3,337,173
TIRE SUPPORT
Filed Jan. 27, 1966 4 Sheets-Sheet 1

INVENTORS
LESLIE E. SODERQUIST
KARL KLOSE
BY Hamilton & Cook
ATTORNEYS

Aug. 22, 1967

L. E. SODERQUIST ET AL 3,337,173

TIRE SUPPORT

Filed Jan. 27, 1966

INVENTORS
LESLIE E. SODERQUIST
KARL KLOSE
BY Hamilton & Cook

ATTORNEYS

Aug. 22, 1967 L. E. SODERQUIST ET AL 3,337,173

TIRE SUPPORT

Filed Jan. 27, 1966 4 Sheets-Sheet 4

INVENTORS
LESLIE E. SODERQUIST
KARL KLOSE
BY *Hamilton & Cook*

ATTORNEYS

United States Patent Office 3,337,173
Patented Aug. 22, 1967

3,337,173
TIRE SUPPORT
Leslie E. Soderquist, Silver Lake, and Karl Klose, Akron, Ohio, assignors to McNeil Corporation, Akron, Ohio, a corporation of Ohio
Filed Jan. 27, 1966, Ser. No. 523,470
12 Claims. (Cl. 248—278)

The present invention relates generally to improvements for automatic apparatus for loading unvulcanized tire bands into tire presses for fully shaping and curing tires within opposed separable or relatively movable top or upper and bottom or lower mold sections or halves. More specifically, the invention relates to improved support and positioning devices, for use with automatic press loading apparatus, the devices being particularly adapted for uncured tire bands which, for reasons of tire construction, have been built or partially shaped or preformed prior to delivery to the press for final shaping and curing.

Automatic press loading apparatus concepts have been disclosed in a number of prior patents granted to L. E. Soderquist and owned by the assignee of the present application, including U.S. Patent Nos. 2,927,343; 2,976,566; 2,997,738; 3,030,658; 3,134,136; and 3,167,810. These automatic loading apparatus concepts have contributed to the progress and enrichment of the art by eliminating tedious and inefficient manual press loading operations, thereby increasing press productivity and enhancing product quality and uniformity by minimizing the factor of human error inherent in prior manual loading methods.

Other prior art press loader concepts have contemplated utilization of specific constructions for tire band holders or chucks, including basket-type devices on elevator mechanisms carried on the upper press head or top mold section of a tire press having opening and closing movements of a rectilinear vertical and lateral character.

Heretofore, automatic loaders have been positioned and coordinated with tire band supply conveyors or platforms which were especially adapted to hold unvulcanized tire bands of conventional "pulley band" or barrel configuration. However, with the advent of tire band constructions which are built or partially shaped or preformed prior to delivery to the press for final shaping and curing, and especially with the adoption of radial ply tire bands, it has become important that the lower bead portions of the bands be accurately positioned on the platform or support at the exterior of the press with relation to the datum of the lower mold section bead seating surfaces. This accurate positioning is necessary to ensure proper automatic loading of the tire band into concentric registry with the lower mold section of the press.

Furthermore, the axially elongate torus shape of the partially preformed or radial ply tire band must be maintained to ensure proper final shaping and curing of the tire, without chafing of the tire bead regions or creation of other defects in the tire and without damage to the press center mechanism or shaping diaphragm. In some instances, due to partial collapse or deformation of the shape of the uncured tire band during storage and handling prior to delivery to the press, it is necessary that the press loading chuck or its associated supply mechanisms restore the band to its proper configuration before loading and final shaping and curing. Furthermore the weight of the tread portion of many preformed tire bands causes a sagging deformation of the flexible sidewall portions of the band if it is supported by resting on its bottom bead portion on previously employed or conventional tire band loader supply platforms or pans.

It is, therefore, an object of the present invention to improve the operation of a press being used for the final shaping and curing of at least partially shaped or preformed uncured tire bands, such as radial ply tire bands.

It is a further object of the present invention to improve the loading operation of locating and positioning such partially preformed uncured tire bands in operative concentric registry in the open press.

It is a still further object of the invention to furnish an improved supply support mechanism for such uncured tire bands providing accurate positioning of the bands with relation to the datum of the bead engaging surfaces of the lower mold section of the press.

It is another object of the invention to provide an improved tire band supply support mechanism as aforesaid which will primarily support the weight of the band by its upper bead and will restore and maintain the proper configuration of such partially preformed uncured tire bands for optimum final shaping and curing operations in the press.

It is yet another object of the invention to furnish such an improved supply support mechanism which can be utilized efficiently with automatic loading apparatus, as described and referred to above, to provide two partially shaped or preformed uncured tire bands ahead of each mold of a tire press for automatic loading thereof with minimum delay and manual servicing.

These and other objects and advantages of the invention will be apparent in view of the following detailed description of one preferred embodiment when read in conjunction with the attached drawings.

In general, the invention relates to a novel uncured tire band support mechanism having a plurality of outwardly biased pivotable tire band support staves or arm members specially contoured and proportioned to hold a partially shaped or preformed tire band by supporting its weight primarily from its upper bead or crown region. The support mechanism is also preferably adjustable in the vertical or axial and horizontal or radial directions to accommodate a wide range of tire band sizes and bead diameters.

Figure 1:
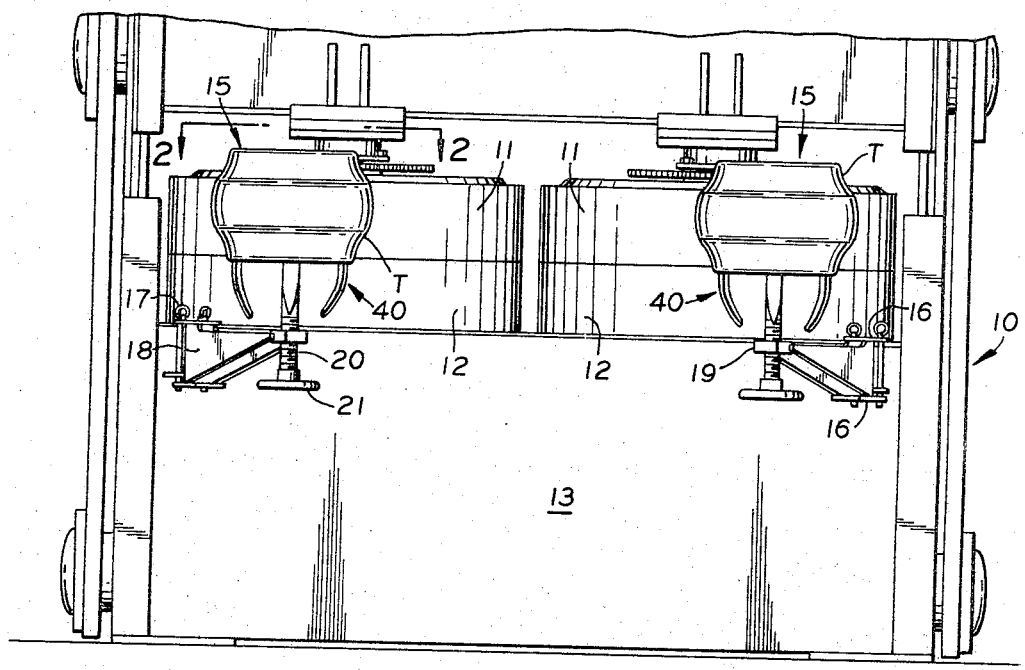
FIG. 1 is a partial front elevational view of a dual mold tire shaping and vulcanizing press with a pair of novel tire band support mechanisms according to the present invention mounted thereon carrying partially preformed radial ply tire bands.

Referring to FIG. 1, a dual tire shaping and curing press is indicated generally by the numeral 10 as comprising movable top mold sections 11 and bottom mold sections 12 mounted on a press base or bed 13. Suitable tire presses are disclosed in a number of prior art patents, including for example U.S. Patent No. 2,808,618 to L.E. Soderquist. For shaping and curing partially preformed or radial ply tire bands, such presses are preferably equipped with permanent bag or diaphrgam center mechanisms as disclosed in L. E. Soderquist application Ser. No. 341,999, filed Feb. 3, 1964.

While the tire band support mechanism of the present invention may be utilized to restore and maintain a partially preformed tire band to proper configuration for manual loading, the press 10 is preferably equipped with a suitable automatic loading apparatus, not shown but discussed above with reference to prior patents. Moreover, though the preferred form of tire band support mechanism hereinafter described is mounted on the press bed 13 as a platform or shelf-like supply station, it will be understood that the support mechanism may be mounted or positioned on the floor alongside the press or on dollies or carts which may be thus positioned.

Figure 2:
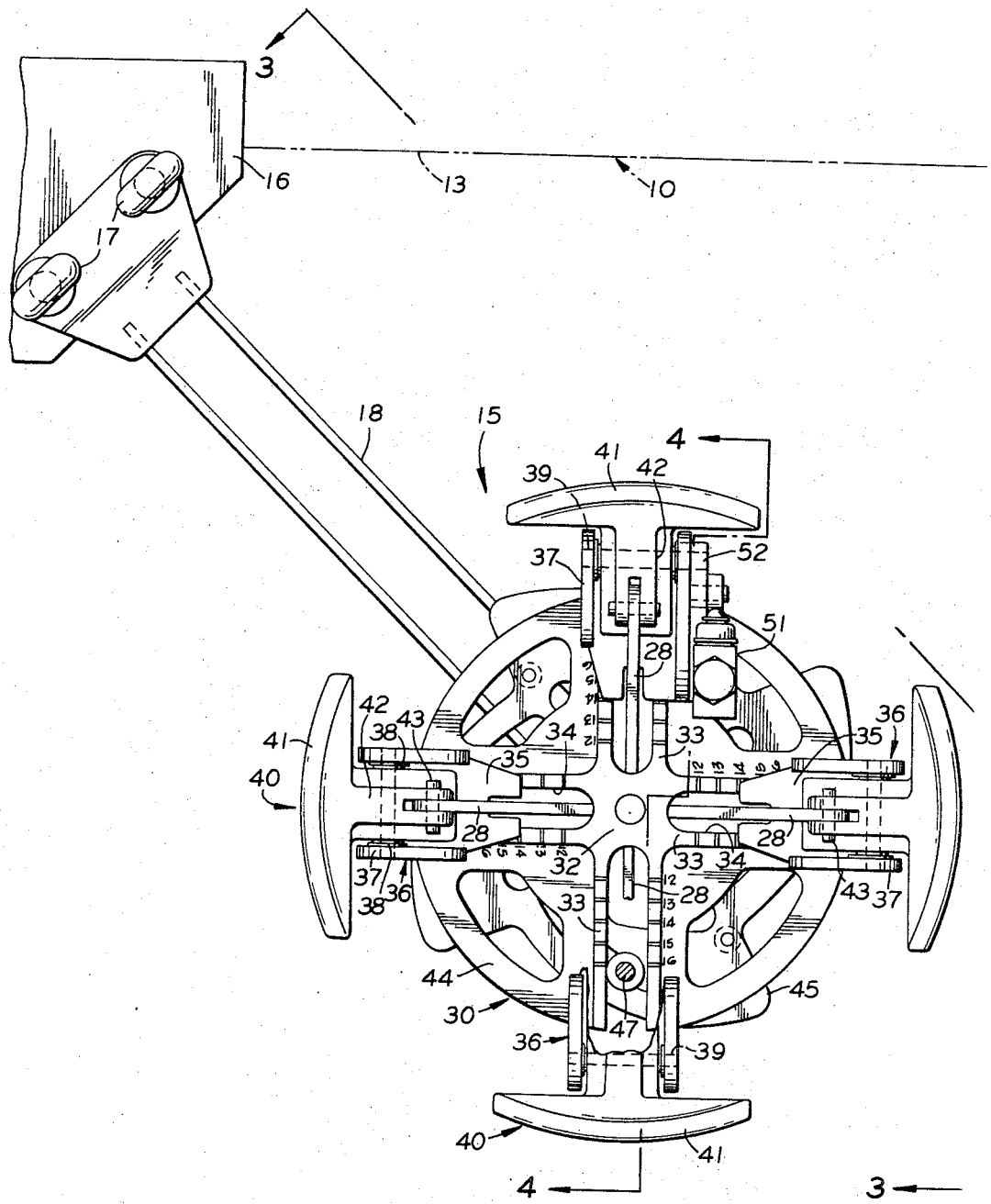
FIG. 2 is a partially fragmentary top or plan view on line 2—2 in FIG. 1 of a support mechanism, the uncured tire band being removed.
Figure 3:
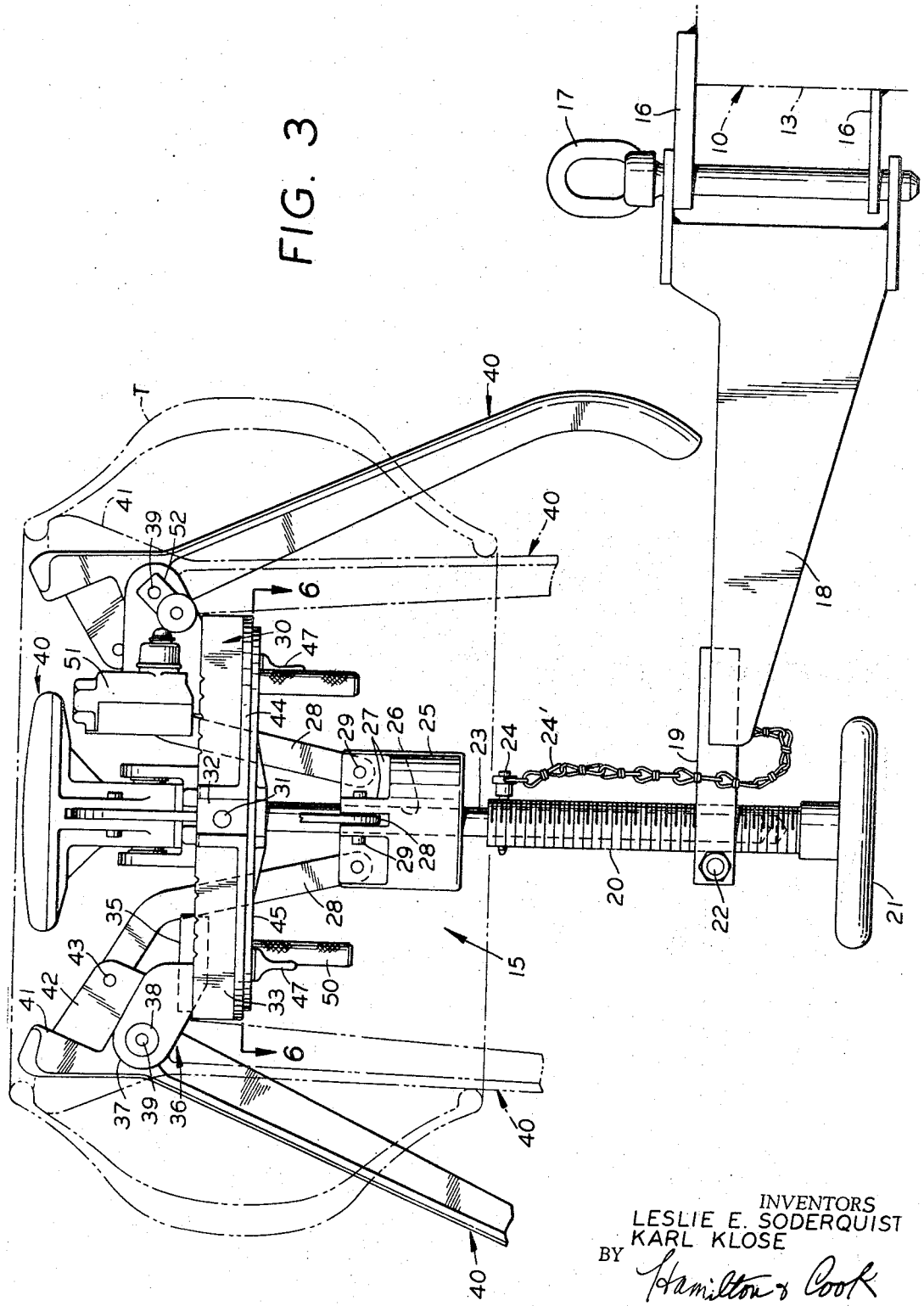
FIG. 3 is a side elevational view on line 3—3 in FIG. 2, parts being broken away for purposes of clarity of illustration and the position of support members with a tire band thereon being depicted in phantom lines.

In the drawings, the improved tire band support mechanism is designated generally by the numeral 15, with the tire bands T carried thereon having an axially elongate torus shape due to their having been built or preliminarily shaped into a partially preformed configuration. Referring to FIGS. 2 and 3, a pair of horizontal bracket plates 16 are welded or otherwise secured to the press bed 13 and are bored to receive a pair of removable eye-pins 17 providing a cantilever support connection for a jib arm or beam member 18. Member 18 terminates at its outer end in a split block 19 having a threaded bore therethrough to receive a jackscrew 20. A handwheel 21 is secured to the lower end of the jackscrew 20 to facilitate elevational adjustment of the tire band support mechanism 15, so that the lower bead portion of the tire band T may be positioned at a proper height with respect to the datum planes established by the bead engaging surfaces within the lower press mold section 12. The vertical adjustment thus afforded enables the support mechanism 15 to accommodate a wide range of axial lengths or "widths" of the partially preformed tire bands T and ensures accurate automatic loading thereof into concentric registry with the lower press mold sections 12.

A bolt 22 is provided in the split block 19 for tightening or clamping the threaded bore in the block 19 about the adjusting jackscrew 20 to thereby selectively lock the mechanism 15 at a preselected height.

Referring to FIG. 3, the jackscrew is bore longitudinally to receive a shaft 23 therein which is keyed or pinned thereto by a removable lock pin 24 which is secured to a chain 24' attached to the jib arm 18 to prevent loss of the pin 24. A generally cylindrical counterweight 25 has a bore 26 by which it is mounted in a free sliding fit for vertical travel on the shaft 23 to bias parts of the mechanism 15 in a manner hereinafter described. The counterweight 25 at its top is formed into or provided with four pairs of equally spaced clevis brackets 27 to which four curved links 28 are pivotally connected by pins 29.

Figure 4:
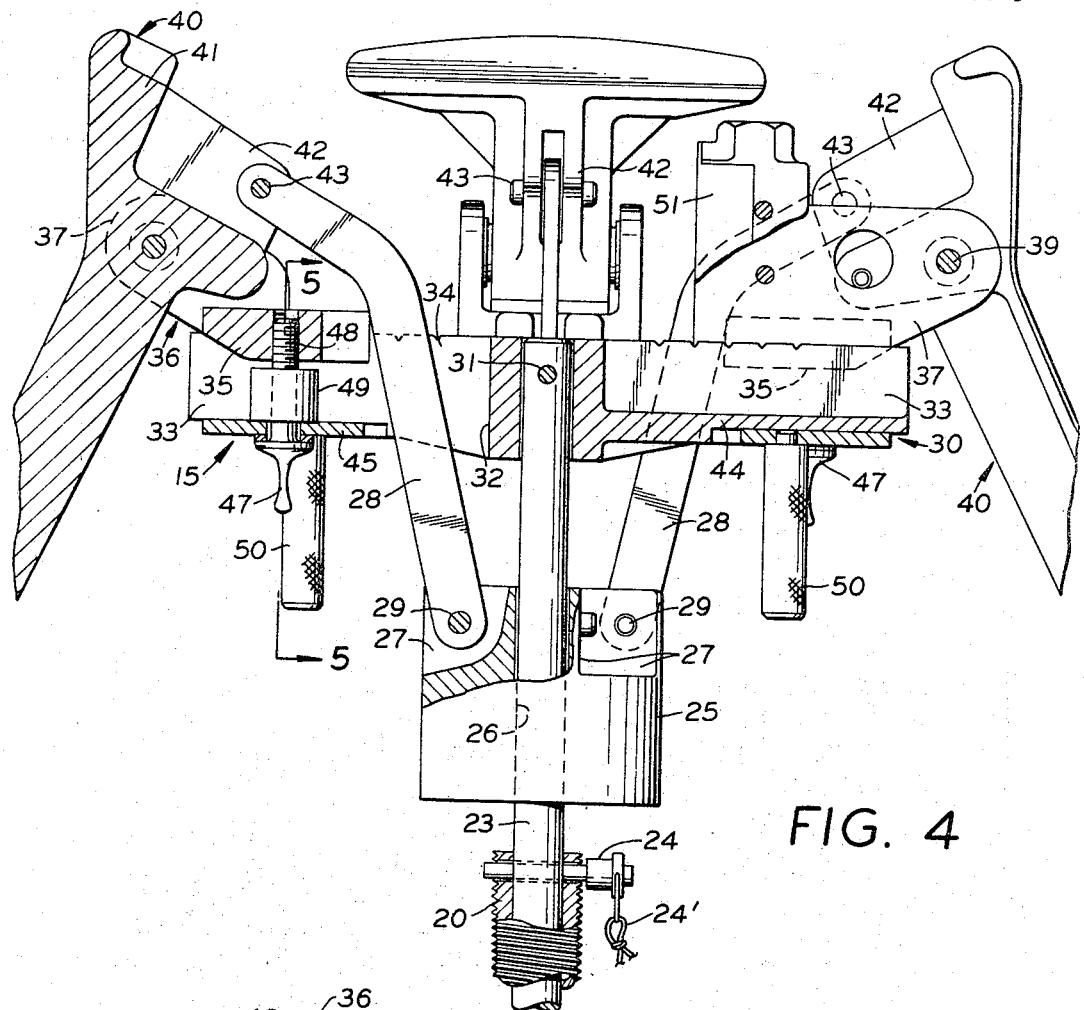
FIG. 4 is an enlarged elevational sectional view taken substantially on line 4—4 of FIG. 2.
Figure 5:
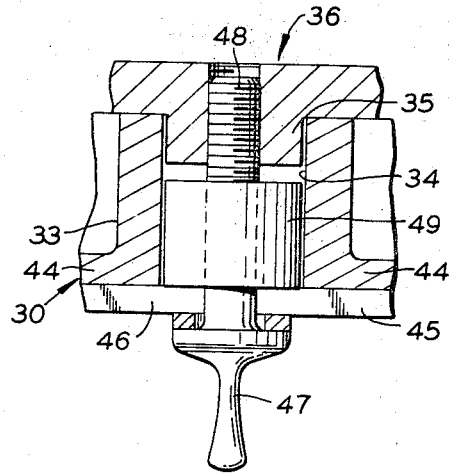
FIG. 5 is an enlarged fragmentary sectional view on line 5—5 in FIG. 4 of a cam plate roller and thumb screw as shown in the sectional view of FIG. 4.

The top of shaft 23 terminates in a generally circular spider 30 which is keyed or secured to the shaft 23 as by a pin 31 through its hub portion 32. Spider 30 is cast or fabricated with four equally spaced flat spoke members 33 radiating from the hub portion 32 and having radially oriented slots or ways 34 therein through which the four curved links 28 emerge upwardly. As best seen in FIGS. 4 and 5, each way has disposed therein a slide tongue portion 35 of a pillow block bearing 36 for radial sliding adjustment movement in a manner described below. The flat top surfaces of the spoke members 33 are also preferably scribed or notched with graduated markings, as seen in FIG. 2, corresponding to the bead diameters of various sizes of tire bands T for which the support mechanism 15 may be radially adjusted.

Each pillow block bearing 36 is formed with two outwardly extending ear brackets 37 having bearings 38 therein journaling a fulcrum axle 39 to which a tire band support stave or arm member 40 is secured for operative pivoting in the bearings 38.

Each tire band support stave 40 has at its upper end a sector shoe portion 41 formed and proportioned to engage a partially preformed tire band at its interior surfaces near the upper bead or crown. The shoulder configuration of the sector shoe portions 41 preferably corresponds to the construction shape of the tire band so as to prevent chafing or deformation of the bead area of the band.

The sector shoe portion 41 of each support stave 40 joins with a radially inwardly directed clevis bracket 42 by which a pivot connection is made to the upper end of the curved link 28 by a pin 43. As best seen in FIG. 3, the pivot at pin 43 is above the journal support for the support stave 40 at its fulcrum axle 39. Thus, downward travel of the counterweight 25 on the shaft 23 produces a radially outward and arcuately upward movement of the support staves 40 to the positions shown in full lines in FIG. 3. Conversely, as shown in phantom or chain lines, the weight of a tire band T on the medial portions of the support staves 40 causes upward travel of the counterweight 25. Its weight, however, then exerts a radially directed supporting force on the lower bead of the tire band through the influence of the link and fulcrum system just described.

Figure 6:
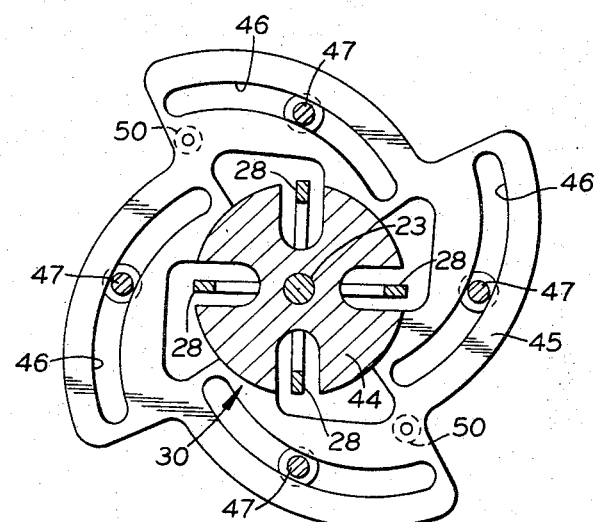
FIG. 6 is a plan sectional view on line 6—6 in FIG. 3.

Referring particularly to FIGS. 4, 5 and 6, each spoke 33 of the spider 30 is joined at the bottom of the spider to its adjacent spokes by generally circular sector plate portions 44 thereby forming a register surface for a cam plate 45. Cam plate 45 has four equally spaced skewed curvilinear cam trackways 46 therein which four thumbscrew cam followers 47 ride. The threaded shank 48 of each thumbscrew 47 is received in a threaded bore in the slide tongue portion 35 of the pillow block bearing 36. The thumbscrew cam followers 47 preferably carry rollers 49 thereon riding in the radial slots or ways 34 in the spokes 33. Two generally diametrically oppositely located handles 50 are secured to the cam plate 45 for selectively manually rotating the cam plate to effect uniform radial adjustment of the four pillow block bearings 36, and the tire band support staves 40 carried thereon, by virtue of the camming action of the thumbscrew cam followers 47 in the skewed curvilinear cam trackways 46.

To adjust the tire band support mechanism radially to accomodate tire bands of various bead diameters, the thumbscrew cam followers 47 are loosened; and the cam plate 45 is rotated by grasping the handles 50 and twisting the cam plate 45 either clockwise or counterclockwise, depending upon whether the adjustment of the mechanism 15 is to be radially increased or decreased, respectively.

As seen in FIGS. 2 and 3, the mechanism 15, when used with automatic tire band loading apparatus, is preferably equipped with an electrical limit switch 51 and an actuator roller arm 52 carried on the fulcrum axle 39 of one support stave 40 to actuate the switch when a tire band T is present on the support mechanism 15. Actuation of the switch 51 produces an electrical signal fed to an electrical controller (not shown) to initiate or permit subsequent operations of the automatic loading apparatus.

From the foregoing detailed description of one preferred embodiment of the invention, it should be appreciated that certain details of construction or components may be modified or replaced by equivalent structure or parts without departing from the spirit and scope of the invention. For example, spring loading or other means of biasing the tire band support arms 40 may be employed instead of the counterweight and lever-linkage system described. Furthermore, template-type cams, compound crank-levers, or other cams may be utilized rather than the slotted cam plate 45 and associated adjusting and operating mechanisms as shown and described.

For universal utility of the tire band support mechanism 15, the sector shoe portions 41 at the upper ends of the tire band support arms or staves 40 are preferably provided with radially inwardly projecting or extending sector ledges or lugs formed or adapted to support the lower bead regions of an upstanding conventional flat-built or bias ply unvulcanized tire band. In such instances, the pivoting action of arms 40 about the fulcrum axle 39 may be arrested or locked by a suitable stop, lock-pin or brake mechanism.

It should therefore be apparent that the several objects and advantages of the invention may be achieved with apparatus as herein described and illustrated, and it is appropriate and proper that the scope of the invention be measured solely by the appended claims and not by the details of the foregoing disclosure.

What is claimed is:

1. A support mechanism for a partially preformed unvulcanized tire band comprising, a plurality of tire band support arm means arrayed to receive a said tire band in telescoped relation thereover, support framework means, journal means mounted on said support framework means and pivotally carrying said arm means, and biasing means carried on said framework means and connected to said arm means to urge said arm means radially outwardly.

2. A support mechanism for a partially preformed unvulcanized tire band, according to claim 1, wherein said support framework means comprises, elevational adjustment means to adjust said support mechanism vertically.

3. A support mechanism for a partially preformed unvulcanized tire band, according to claim 1, wherein said support framework means comprises, radial adjustment means to effect selective radial adjustment movement of said journal means and the said tire band support arm means carried thereon.

4. A support mechanism for a partially preformed unvulcanized tire band, according to claim 3, wherein said radial adjustment means comprises, camming means for concurrent and coordinated adjustment movement of said support arm means.

5. A support mechanism for a partially preformed unvulcanized tire band, according to claim 4, wherein said camming means comprises, a spider having radially extending guides therein, said journal means being operatively disposed in said guides for sliding movement therein, a rotatable cam plate registered on said spider and having cam trackways therein, and cam followers riding in said cam trackways and operatively connected to said journal means for radial movement thereof upon rotation of said cam plate.

6. A support mechanism for a partially preformed unvulcanized tire band, according to claim 1, wherein said biasing means comprises, an axially movable counterweight pivotally connected by lever linkage to said arm means above the fulcrums formed by said journal means.

7. A support mechanism for a partially preformed unvulcanized tire band, according to claim 6, wherein said support framework means comprises, a shaft, said shaft joining with jackscrew means for elevational adjustment of said mechanism and said counterweight being axially movable along said shaft.

8. A support mechanism for a partially preformed unvulcanized tire band, according to claim 1, wherein said support arm means comprise, support stave members having sector shoe members at the tops thereof formed and proportioned to conform to the interior bead heel regions of a said band, whereby the weight of said band on said mechanism is supported primarily by its upper bead.

9. A support mechanism for a partially preformed unvulcanized tire band, according to claim 1, further comprising, electrical switch means actuated by said arm means to sense the presence of a said band on said mechanism.

10. A tire band support mechanism for a press for shaping and curing partially preformed unvulcanized tire bands comprising, a horizontal jib arm adapted for attachment to the bed of said press, a vertical jackscrew extending upwardly from said jib arm, a shaft joining said jackscrew and extending upwardly therefrom, a spider carried at the upper end of said shaft and having radially extending ways therein, a plurality of journals operatively movably mounted in said ways, tire band support staves pivotally suspended by said journals, link members pivotally connected at the upper ends thereof to said support staves above the fulcrums defined by said journals, and a counterweight carried on said shaft and axially movable therealong, the lower ends of said link members being pivotally connected to said counterweight.

11. A tire band support mechanism for a press for shaping and curing partially preformed unvulcanized tire bands, according to claim 10, further comprising, a rotatable cam plate registered on said spider and having skewed curvilinear cam trackways therein, and cam followers riding in said cam trackways and connected to said journals for selective radial adjustment movement thereof upon rotation of said cam plate.

12. A tire band support mechanism for a press for shaping and curing partially preformed unvulcanized tire bands, according to claim 11, further comprising sector shoe portions at the upper ends of said support staves formed and proportioned to conform to the interior bead heel regions and adjacent interior sidewall regions of a said band, whereby the weight of said band on said mechanism is supported primarily by its upper bead to prevent deformation of said band.

References Cited

UNITED STATES PATENTS

| | | | |
|---|---|---|---|
| 1,223,085 | 4/1917 | Manierre | 248—283 |
| 1,286,241 | 12/1918 | Crowl | 248—283 |
| 1,450,235 | 4/1923 | Smolk | 211—23 X |
| 2,686,648 | 8/1954 | Oehler | 248—309 |
| 3,184,200 | 5/1965 | McDonnell | 248—240 |

ROY D. FRAZIER, *Primary Examiner.*

JOHN PETO, *Examiner.*